US00RE40672E

(19) United States
(12) Reissued Patent
Whitmore

(10) Patent Number: US RE40,672 E
(45) Date of Reissued Patent: Mar. 24, 2009

(54) CATHODIC PROTECTION OF CONCRETE

(76) Inventor: David Whitmore, 38 Kings Drive, Winnipeg, Manitoba (CA), R3T 3E5

(21) Appl. No.: 11/585,305

(22) Filed: Oct. 24, 2006

Related U.S. Patent Documents

Reissue of:
(64) Patent No.: 6,165,346
Issued: Dec. 26, 2000
Appl. No.: 09/245,373
Filed: Feb. 5, 1999

(51) Int. Cl.
*C23F 13/08* (2006.01)

(52) U.S. Cl. ..... 205/734; 204/196.18; 204/198.19
(58) Field of Classification Search ..... 205/734, 205/729; 204/196.18, 196.19, 196.01, 196.02, 204/196.04, 196.1, 196.22, 196.24, 196.25, 204/196.3, 196.33, 196.36
See application file for complete search history.

(56) References Cited

U.S. PATENT DOCUMENTS

| | | | |
|---|---|---|---|
| 1,269,926 | A | 6/1918 | Gesell |
| 2,193,667 | A | 3/1940 | Barry |
| 2,565,544 | A | 8/1951 | Brown |
| 2,743,227 | A | 4/1956 | Gaite et al. |
| 3,414,496 | A | 12/1968 | Sudbury et al. |
| 3,488,275 | A | 1/1970 | Lloyd |
| 4,265,725 | A | 5/1981 | Tatum |
| 4,435,264 | A | 3/1984 | Lau |
| 4,506,485 | A | 3/1985 | Apsotolos |
| 4,692,066 | A | 9/1987 | Clear |
| 4,874,487 | A | 10/1989 | Reed |

(Continued)

FOREIGN PATENT DOCUMENTS

| | | |
|---|---|---|
| EP | 0 280 427 | 8/1988 |
| EP | 0 479 337 A2 | 4/1992 |
| EP | 0 499 437 A1 | 8/1992 |
| NL | 7608443 | 1/1978 |
| WO | WO-92/01824 | 2/1992 |
| WO | WO-93/12052 | 6/1993 |
| WO | WO-94/29496 | 12/1994 |
| WO | WO-98/16670 | 4/1998 |

OTHER PUBLICATIONS

Norcure brochure "Is Salt Induced Corrosion Causing Problems with your Concrete Structures?" Nov. 1994.*
Vector brochure "The Concrete Restoration and Protection Specialist " Mar. 1995.*
Nocure brochure "Changing the face of concrete repair" No month/year available.*
Jack Bennett, Chemical Enhancement of Metallized Zinc and one Performance, 1998, 640/1–640/12, NACE International, Houston, Texas.
International Conference on Corrosion and Rehabilitation of Reinforced Concrete Structures, Dec. 7–11, 1998, Orlando, Florida.

*Primary Examiner*—Bruce F Bell
(74) *Attorney, Agent, or Firm*—Stites & Harbison PLLC; Ross F. Hunt, Jr.

(57) ABSTRACT

An existing concrete structure is restored by embedding sacrificial anodes into the concrete layer at spaced positions over the layer and connecting the anodes to the reinforcing members to provide a cathodic protection against corrosion. Each anode is inserted into a drilled hole in the layer of sufficient depth to expose the reinforcement. A steel pin passes through a bore in the cylindrical anode and is attached to the reinforcement by arc welding or by impact so as to hold the anode rigidly within the hole. The hole is filled by a settable filler material. In order to maintain effective current conduction from the anode to the reinforcement through the filler over an extended period to maintain the required protection, there is added a material to hold the pH in a preferred range of the order of 12 to 14 and a deliquescent material to absorb moisture into the filler.

46 Claims, 5 Drawing Sheets

U.S. PATENT DOCUMENTS

| | | | |
|---|---|---|---|
| 5,141,607 | A | 8/1992 | Swiat |
| 5,174,871 | A | 12/1992 | Russell |
| 5,183,694 | A | 2/1993 | Webb |
| 5,254,228 | A | 10/1993 | Westhof |
| 5,292,411 | A | 3/1994 | Bartholomew et al. |
| 5,296,120 | A | 3/1994 | Bennett et al. |
| 5,364,511 | A | 11/1994 | Moreland |
| 5,366,670 | A | 11/1994 | Giner |
| 5,431,795 | A | 7/1995 | Moreland et al. |
| 5,505,826 | A | 4/1996 | Haglin |
| 5,609,748 | A | 3/1997 | Kotowski et al. |
| 5,650,060 | A | 7/1997 | Huang |
| 5,714,045 | A | 2/1998 | Lasa |
| 5,968,339 | A | 10/1999 | Clear |
| 6,022,469 | A | 2/2000 | Page |
| 6,033,553 | A | 3/2000 | Bennett |
| 6,165,346 | A | 12/2000 | Whitmore |
| 6,303,017 | B1 | 10/2001 | Page et al. |
| 6,332,971 | B1 | 12/2001 | Hill |

* cited by examiner

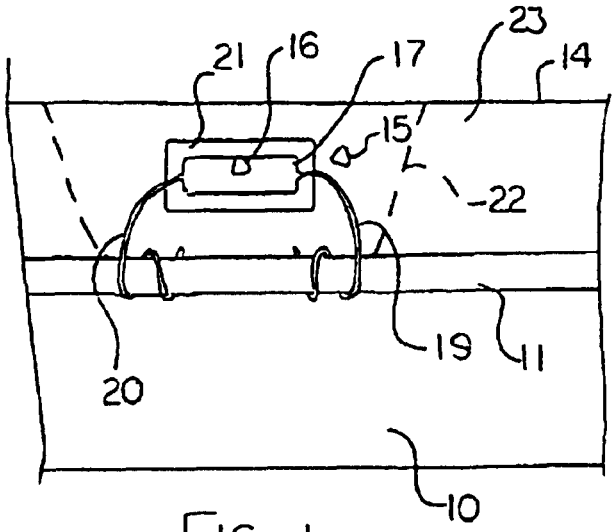
FIG. 1
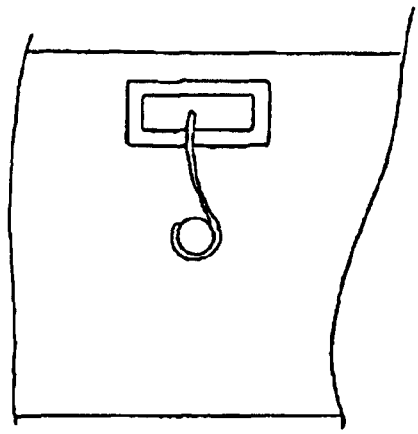
FIG. 2
FIG. 3
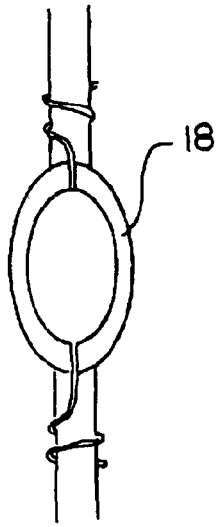

Anode Blocks Current Output Over Time
(Designation: Humectant/Alkali)

CATHODIC PROTECTION OF CONCRETE

Matter enclosed in heavy brackets [ ] appears in the original patent but forms no part of this reissue specification; matter printed in italics indicates the additions made by reissue.

This invention relates to a method for cathodic protection of concrete.

BACKGROUND OF THE INVENTION

It is known that corrosion of steel in concrete can be reduced or halted by generating movement of ions within the concrete structure between an anode and a cathode defined by the conventional metal reinforcing members within the concrete. Techniques are available for cathodic protection in which sufficient current is generated to maintain an ongoing protection and for restoration in which the current is used for a relatively short time but at a sufficient value to cause restorative effects.

Various restorative effects can be obtained including particularly the extraction of chloride ions from the concrete which would otherwise cause corrosion of the metal reinforcement leading to degradation of this structure and spalling of the concrete material covering the reinforcing members. In this method an electrolyte is carried in a porous material between the outside surface of the concrete and the anode.

Examples of this method are shown and described in detail in a brochure by Norcure Chloride Removal Systems Inc. entitled "Is Salt Induced Corrosion Causing Problems with your Concrete Structures", in a brochure by Vector Construction entitled "The Concrete Restoration and Protection Specialists" and in a brochure by "Fosroc/NCTAS" entitled "Norcure Desalination". These brochures describe a technique which is used for various concrete structures including bridge decks and the brochure by Fosroc shows particularly a technique in which a bridge deck is restored using this anodic method.

In the brochure and as generally used in practice, after the concrete surface is exposed by removal of any covering layers, a porous material is laid down onto the upper surface and this receives an electrolyte. The porous material is then covered by a mesh type electrode in the form of wire netting which is then covered by a further layer of the porous material.

A current supply is connected between the mesh anode and the reinforcing steel of the concrete and over an extended period of many weeks this acts to cause the transfer of ions from the concrete material through the electrolyte to provide a restorative effect.

The increased usage of salt as a de-icing agent in freezing conditions has severely exacerbated the problem of chloride degradation of concrete structures.

Restoration of concrete using a temporary current is an entirely different process from impressed current cathodic protection. In the latter process, a small current typically of the order of 1–10 mAmps/sq meter is caused to flow continuously through the life of the concrete for the purpose of inhibiting corrosion.

The current used in the restoration process is strictly temporary for a period of the order of 20 to 90 days and has a value which of the order of 50 to 200 TIMES that of the continuous current. Thus the current in the restoration process may lie in the range 0.4 to 3.0 Amps/sq meter. In addition, the process of restoration must include a liquid electrolyte whereas the continuous process is typically dry. Therefore the types of anode and materials to be used are of an entirely different character.

In PCT Published Application WO94/29496 of Aston Material Services Limited is provided a method for cathodically protecting reinforcing members in concrete using a sacrificial anode such as zinc or zinc alloy. In this published application and in the commercially available product arising from the application, there is provided a puck-shaped anode body which has a coupling wire attached thereto. In the commercially available product there are in fact two such wires arranged diametrically opposed on the puck and extending outwardly therefrom as a flexible connection wire for attachment to an exposed steel reinforcement member.

The puck is surrounded by an encapsulating material such as mortar which holds an electrolyte that will sustain the activity of the anode. The mortar is compatible with the concrete so that electrolytic action can occur through the mortar into and through the concrete between the anode and the steel reinforcing member.

The main feature of the published application relates to the incorporation into the mortar of a component which will maintain the pH of the electrolyte in the area surrounding the anode at a high level of the order of 12 to 14.

In use of the device, a series of the anodes is provided with the anodes connected at spaced locations to the reinforcing members. The attachment by the coupling wire is a simple wrapping of the wire around the reinforcing bar. The anodes are placed in location adjacent to the reinforcing bars and re-covered with concrete to the required amount.

Generally this protection system is used for concrete structures which have been in place for some years sufficient for corrosion to start. In general, areas of damage where restoration is required are excavated to expose the reinforcing bars whereupon the protection devices in the form of the mortar covered puck are inserted into the concrete as described above and the concrete refilled.

These devices are beginning to achieve some commercial success and are presently being used in restoration processes. However improvements in operation and ergonomics are required to improve success of this product in the field.

In International Publication WO98/16670 of Bennett and Clear is disclosed another cathodic protection system intended to be used as a surface arrangement. This arrangement relates to a thinly sprayed zinc or zinc alloy which is applied onto the surface of the concrete. This zinc or zinc coating is then used as an anode to supply current for the cathodic protection process. As the anode is exposed at the surface, this may be used either as a sacrificial system in which there is no applied current and the anode is gradually eroded as the electrolytic process proceeds or as an impressed current cathodic protection system.

The improvement of the above Bennett application relates to the application of a humectant in free-flowing form which is positioned at or near the interface between the zinc anode coating and the concrete surface. It has been found and is disclosed in this application that the provision of the humectant in free-flowing form acts to absorb moisture from the area above the surface. The humectant is defined in the application as being either deliquescent or hygroscopic where a deliquescent material is one which becomes moist or liquefied after exposure to humid air and a hygroscopic material is defined as one which is capable of absorbing moisture from the atmosphere. The humectant is delivered to or near the interface of the anode by application as a solution which is aqueous, colloidal or in an organic solvent such as alcohol. When the humectant in solution is applied to the surface of the anode, it is transported to or near the interface by capillary action. The application states that the humectant is applied to the exposed surface of the anode coating and therefore the anode coating must be sufficiently thin or otherwise arranged to be porous to allow the humectant to reach the interface.

SUMMARY OF THE INVENTION

It is one object of the present invention, therefore to provide an improved method for cathodic protection of concrete.

According to one aspect of the invention there is provided a method for cathodic protection of a concrete structure comprising:

providing a concrete structure having a steel reinforcing member and a layer of concrete covering the reinforcing member so as to define a surface of the concrete layer spaced from the reinforcing member;

providing a sacrificial anode member;

locating the anode member so as to be at least partly in contact with the layer;

arranging the anode member and the steel reinforcing member so that an electrical potential therebetween causes a current to flow through the concrete layer tending to inhibit corrosion of the steel reinforcing members;

the sacrificial anode member being covered on at least one surface thereof by a filler material in contact with the concrete layer which allows communication of current through the material and the layer between the anode member and the reinforcing member;

the filler material containing a deliquescent material which is bound into the filler material.

Preferably the filler material is a solid when in the finished condition in the concrete layer. However gels or pastes can also be used.

Preferably the anode member is buried in the concrete layer so as to be located within the concrete layer spaced from the surface. In this way it is maintained fully protected and also it does not interfere with the appearance of the concrete structure. In some arrangements however an anode in a pad form can have one surface only covered by the filler material and can have that surface applied to the outer surface of the concrete layer so that the remainder of the anode body faces upwardly from the surface of the concrete.

Preferably therefore the filler material substantially fully surrounds the anode member to allow the member to be buried and to maximize the surface area in communication with the concrete layer.

Preferably the deliquescent material is in solid form in the filler material, that is the material is maintained bound within the pores or structure of the filler material and is not in liquid or free flowing state when in the operating or finished condition. Generally the material is a salt or other soluble solid which may initially be supplied in aqueous solution for mixing into the filler material particularly where the filler material is cementitious. Thus when the filler material sets, the water is evaporated leaving the deliquescent material in solid crystalline or particulate form.

Preferably the solid filler material has a pH in the range 12 to 14 since this level of alkalinity acts to assist in maintaining the current.

In one embodiment, the solid filler material is attached to and carried by the anode member prior to insertion into the layer.

As an alternative, the anode does not carry the material but instead the method includes the steps of forming a hole in an existing layer of concrete so as to expose a reinforcing member therein, inserting the anode member into the hole, attaching the anode member to the reinforcing member and filling the hole with the solid filler material.

Preferably the hole is a drilled hole.

Preferably the anode member is attached to the reinforcing member by a solid pin rigidly attached to the anode member and rigidly attached to the reinforcing member.

Preferably the pin passes through a bore in the anode member such that the anode member surrounds the pin.

In one preferred arrangement, the pin has one end driven into the reinforcing member by an impact tool.

In an alternative preferred arrangement, the pin has one end electrically welded to the reinforcing member.

In a further alternative arrangement the anode member is attached to the reinforcing member by an impact thereon causing flow of a flowable metal portion to attach the flowable metal portion to the anode member and to the reinforcing member.

Preferably the anode member includes a first portion of a first material having a first level of negative potential and a second portion of a second higher level of negative potential such that the second portion generates a higher current to the steel but is consumed more quickly than the first material.

According to a second aspect of the invention there is provided a method for cathodic protection of a concrete structure comprising:

providing a concrete structure having a steel reinforcing member and a layer of concrete covering the reinforcing member so as to define a surface of the concrete layer spaced from the reinforcing member;

providing a sacrificial anode member;

drilling a hole in an existing layer of concrete so as to expose a reinforcing member therein;

inserting the anode member into the hole, the anode member being shaped for insertion into the drilled hole;

attaching the anode member to the reinforcing member;

filling a remainder of the hole with a filler material;

and arranging the buried anode member and the steel reinforcing member such that an electrical potential therebetween generates a current tending to inhibit corrosion of the steel reinforcing member while causing the sacrificial anode to be consumed.

According to a third aspect of the invention there is provided a method for cathodic protection of a concrete structure comprising:

providing a concrete structure having a steel reinforcing member and a layer of concrete covering the reinforcing member so as to define a surface of the concrete layer spaced from the reinforcing member;

providing a sacrificial anode member;

forming a hole in an existing layer of concrete so as to expose a reinforcing member therein;

inserting the anode member into the hole and rigidly attaching the anode member to the reinforcing member so as to extend therefrom into the hole;

filling a remainder of the hole with a solid filler material;

and arranging the buried anode member and the steel reinforcing member such that an electrical potential therebetween generates a current tending to inhibit corrosion of the steel reinforcing member while causing the sacrificial anode to be consumed.

BRIEF DESCRIPTION OF THE DRAWINGS

One embodiment of the invention will now be described in conjunction with the accompanying drawings in which:

FIG. 1 is a cross sectional view showing schematically a method for restoration of concrete according to the present invention.

FIG. 2 is a cross sectional view at right angles to that of FIG. 1.

FIG. 3 is a top plan view of the embodiment of FIGS. 1 and 2.

DETAILED DESCRIPTION

Figure 4:
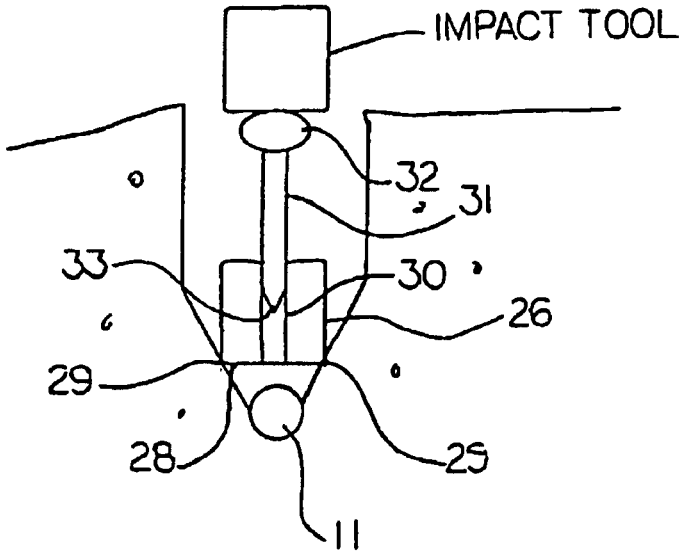
FIGS. 4, 5 and 6 are vertical cross-sectional views showing consecutive steps in a method similar to but modified relative to that of FIG. 1.
Figure 5:
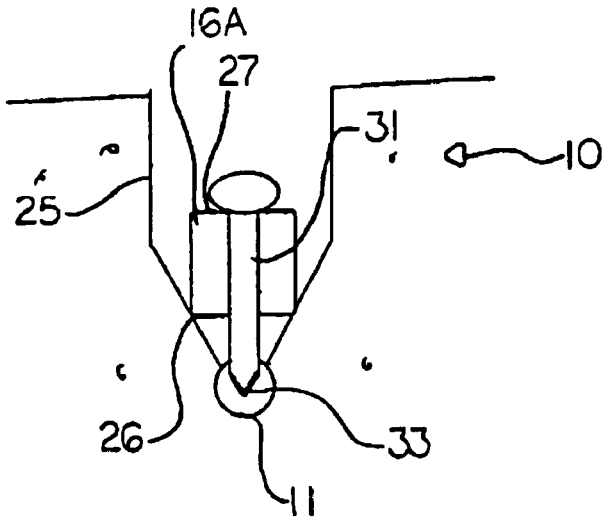
Figure 6:
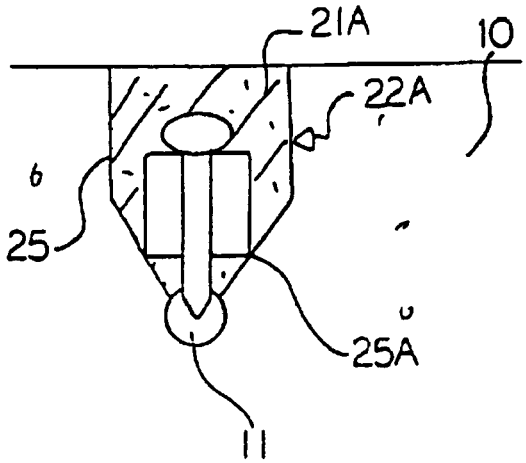
Figure 7:
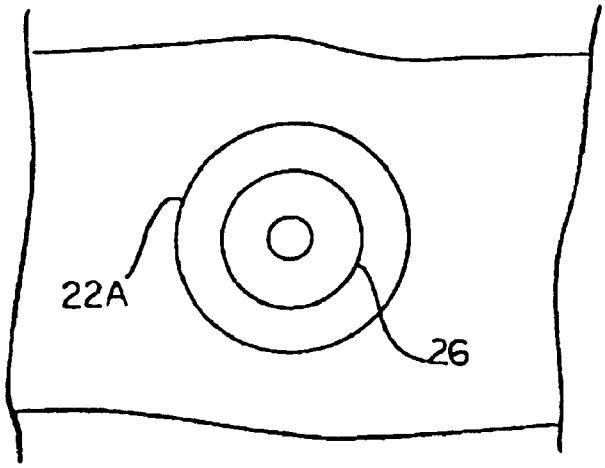
FIG. 7 is a top plan view of the embodiment of FIGS. 4, 5 and 6.

In FIGS. 1, 2 and 3 is shown a first embodiment according to the present invention of an improved cathodic protection device.

The device is of a similar construction to that shown in the above application WO94/29496, the disclosure of which is incorporated herein by reference.

Thus the cathodic protection device is arranged for use in a concrete structure generally indicated at 10 having a reinforcing bar 11 embedded within the concrete and spaced from an upper surface 14 of the concrete.

Embedded within the concrete at a position adjacent to the reinforcing bar 11 is a cathodic protection device generally indicated at 15 which includes a puck-shaped anode body 16. The body 16 is circular in plan view to define a circular upper surface 18 as shown in FIG. 3 and has a cylindrical peripheral surface 17 as shown in FIG. 1. Other shapes of the puck anode body can be provided if preferred but the puck is a convenient form in that it is relatively flat to allow insertion into the body of the concrete and it provides a sufficient volume of the anode material to avoid rapid depletion.

At diametrically opposed positions on the peripheral surface 17 is attached a pair of connecting wires 19 and 20 which are flexible but sufficiently stiff to be self-supporting. Any suitable electrically conductive material such as copper or steel can be used.

Around the anode body is provided a layer of a mortar material 21. In practice the mortar material is moulded around the puck so as to provide a thickness of a mortar material around the full periphery and on the top and bottom surfaces of the puck with the thickness being of the order of 1cm. The wires 19 and 20 pass through the mortar and then the mortar is cast in place after the wires are attached to the anode material.

The mortar forms an electrolyte which is in intimate communication with the concrete layer so that a current can flow from the anode to the steel reinforcement.

The mortar contains and supports also suitable materials to maintain the pH in the range 12 to 14 as described in the above application. As described in the above application, Portland cements of intrinsically higher alkali content (i.e. those containing relatively high proportions of $Na_2O$ and $K_2O$) can be used or other cements can be used with supplementary alkalis in the form of LiOH, NaOH or KOH for example. These materials are mixed into the mortar prior to the casting on the anode body.

In addition to the above materials, there is also applied into the mortar material a humectant or deliquescent material. Suitable materials include $Ca(NO_3)_2$, $CaCl_2$, $LiNO_3$, $CaNO_2$, $MgCl_2$, $Ca(SO_4)_2$ and many others well known to one skilled in the art. Such deliquescent are basically in solid or powder form but can be dissolved to form an aqueous solution. When forming into the mortar, the material can be supplied in the powder form with the cement in a required mixture proportions for adding to water in conventional manner. Alternatively, the material can be supplied in aqueous solution where some or all of the water is supplied in the solution. However when admixed and the mortar sets, the deliquescent material is firmly bonded into the mortar material with the remaining materials set forth above. Other suitable deliquescent materials are set out in the above mentioned application, the disclosure of which is incorporated herein by reference. In all cases, therefore, the humectant or deliquescent material is carried in or bonded into the surrounding filler material and is not in a free flowing or liquid condition. It cannot therefore migrate in the concrete layer and remains in place in the filler material.

The filler material is preferably a solid so that it can contain and hold the anode without danger of being displaced during the process. However gels and pastes can also be used. The filler material preferably is relatively porous so that it can accommodate expansion of the zinc oxide during consumption of the anode. However voids which might fill with water should be avoided. A covering fabric such as felt can also be used to support the additive materials which are allowed to dry in the fabric pores.

The deliquescent material is thus selected so that it remains supported by and admixed into the mortar so that it can not migrate out of the mortar during storage or in use.

The use of the protection device is substantially as described in the above application WO94/29496 in that it is buried in the concrete layer either at formation of the concrete in the original casting process or more preferably in a restoration process subsequent to the original casting. Thus sufficient of the original concrete is excavated as indicated at the dashed lines 22 to allow the reinforcing bar 11 to be exposed. The wires 19 and 20 are then wrapped around the reinforcing bar and the protective device placed into position in the exposed opening. The device is then covered by a recast portion of concrete as indicated at 23 and remains in place buried within the concrete.

This system is therefore only applicable to a sacrificial anode system where the anode is buried within the concrete. In an alternative arrangement, not shown, the anode can form a pad applied onto the surface of the concrete with the filler material applied to and covering only one surface for contacting the concrete.

The cathodic protection device therefore operates in the conventional manner in that electrolytic potential difference between the anode and the steel reinforcing member causes a current to flow therebetween sufficient to prevent or at least reduce corrosion of the steel reinforcing bar.

The level of the pH and the presence of the humectant enhances the maintenance of the current so that the current can be maintained for an extended period of time in a range 5 to 20 years.

The presence of the deliquescent material bound into the mortar layer acts to absorb sufficient moisture to maintain conductivity around the anode to ensure that sufficient output current is maintained during the life of the anode and to keep the anode/filler interface electrochemically active. The presence also increases the amount of the current. Even though the mortar material 21 is not exposed to the atmosphere as it is buried within the concrete, and even though the deliquescent material is bound in fixed form into the mortar material, it has been found that absorption of moisture into the deliquescent material is sufficient to enhance the maintenance of the current output and to prevent premature reduction of output current over an extended period of operation and before the anode is consumed.

Figure 11:
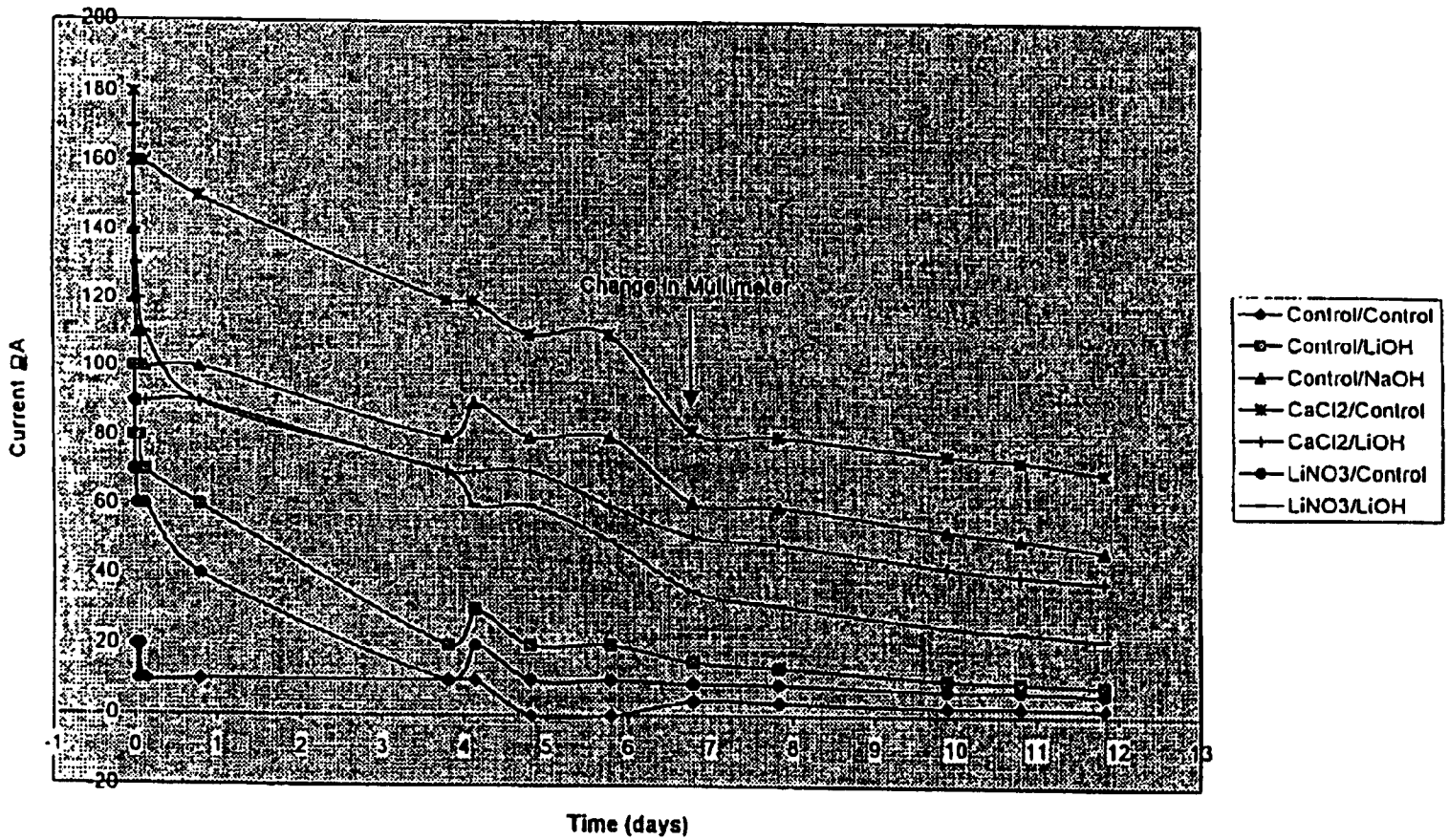
FIG. 11 is a graph showing the current developed by an anode system using different components in the filler material In the drawings like characters of reference indicate corresponding parts in the different figures.

In FIG. 11 is shown a plurality of plots over time of current output for different additives in the mortar material. This shows that a significant increase is obtained in the current by using the humectant in the mortar both in combination with the alkali and without the alkali. While these observations are taken over only a relatively short time scale it can be reasonably predicted that the same advantages in current level will be maintained over an extended period of several years over the normal life of the anode.

Turning now to FIGS. 4 through 7, there is shown an alternative arrangement of the protective device according to the present invention.

Basically the protective device works in a similar manner to that described above in that there is an anode body formed of a suitable material of the required electric potential and that body is electrically connected to the reinforcing bar 11 of the concrete structure 10. The body is also surrounded by a mortar material 21A containing the materials described above. However in this arrangement the mortar material is not carried by the anode body 16A but instead is applied as a subsequent process as a filler to an opening 22A.

In this embodiment, therefore, the opening 22A is a drilled opening which is formed as a circular hole drilled into the concrete and forming a cylindrical hole wall 25 extending down to a base 26 which is sufficiently deep within the concrete structure 10 so as to expose an upper part of the reinforcing bar 11. It is not essential that the reinforcing bar be completely exposed at its upper surface but it is preferred to do so to ensure that the reinforcing bar has indeed been properly located and that the subsequent connection is properly applied to the reinforcing bar without the possibility of missing the reinforcing bar and leaving an open electrical connection.

In this arrangement, there is no necessity to expose the underside of the reinforcing bar to allow access to wrap around the reinforcing bar but only an upper surface of the reinforcing bar needs to be exposed. A drilled hole therefore can suffice and the drilled hole need only have a diameter sufficient to receive the body 16A to ensure the body is wholly contained within the concrete structure 10 after the mortar material 21A is inserted in place to fill the hole 22A.

In one example, the anode body 16A has a cylindrical outer surface 26, a circular top surface 27 and a circular bottom surface 28. Other shapes can also be adopted if preferred. The anode body 16A includes a central longitudinal bore 30. The bore 30 co-operates with an attachment pin 31 having an upper head 32 and lower pointed end 33. Thus a kit of parts for assembling the structure would include a plurality of the anode bodies 16A and a plurality of the pins 31 for assembly into the drilled holes. The outside diameter of the pin 31 is slightly greater than the inside diameter of the hole 30 so that when driven through the hole 30, the pin is firmly engaged into the bore so that there is no possibility of the anode body becoming loose from the pin.

The length of the pin 31 is selected so that it will pass through the bore 30 to a position where the head 32 engages the top surface 27 at which time the pointed lower end 33 is engaged into the reinforcing bar 11.

Suitable impact tools are well-known in the construction industry for driving pins of this type into concrete and steel structures and such tools are wellknown to one skilled in the art.

As shown in FIG. 4, therefore, with the anode body in place in the hole, the pin 31 is located at the top of the bore driven by the impact tool through the bore so that the lower end drives into the reinforcing bar and is attached thereto by cold forming of the reinforcing bar to provide a permanent physical attachment of the pin to the reinforcing bar.

Thus the pin stands vertically upwardly from the reinforcing bar and the anode body is held above the reinforcing bar by the pin. There is therefore no loose coupling and the attachment is entirely rigid so that it can not be disturbed during casting of the mortar material 21A or otherwise. The hole is shaped relative to the anode body so that the whole of the hole is filled with the filler material to prevent voids which can fill with water. In an alternative arrangement, not shown, the hole can be partly filled with the filler material which surrounds the anode body but not the complete hole, with the remainder of the hole being topped up with another filler which can simply be concrete.

As previously described, the mortar material contains the components necessary to enhance the maintenance of the electrolytic current between the anode body and the steel reinforcing bar. However in some arrangements the enhancing components may be omitted or replaced and the advantageous mounting of the anode body used as described above.

Figure 8:
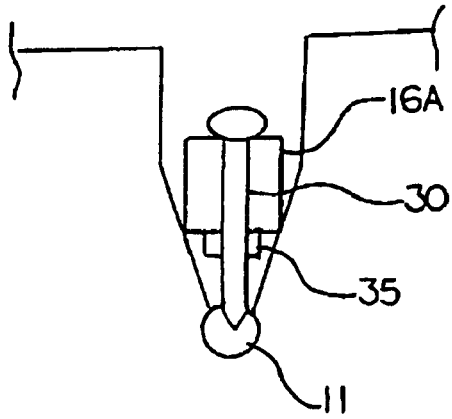
FIGS. 8, 9 and 10 are vertical cross-sectional views showing three further methods similar to but modified relative to that of FIG. 1.
Figure 9:
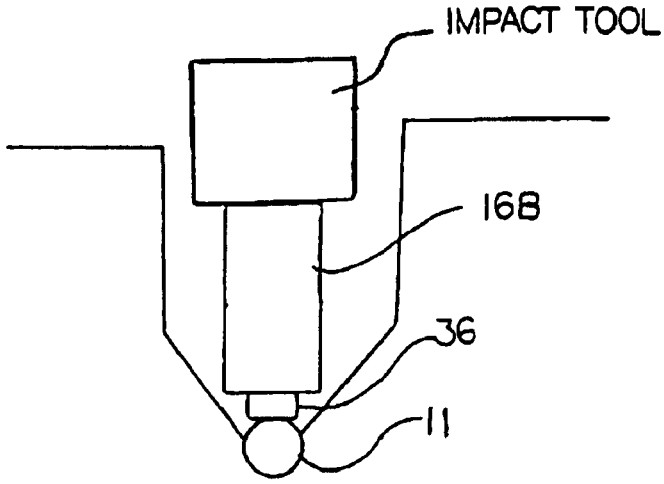
Figure 10:
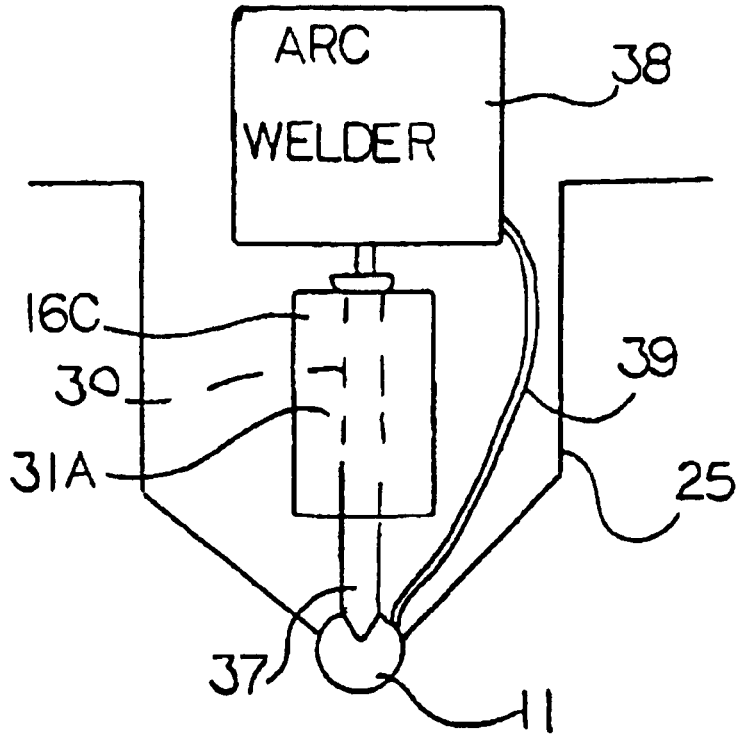

Turning now to FIGS. 8, 9 and 10, yet further modifications are shown which are related to the construction shown in FIGS. 4 through 7 but show further improvements which can be adopted if required.

The anode can be formed of any suitable material which is electro-negative relative to the steel reinforcing members. Zinc is the preferred choice, but other materials such as magnesium or alloys thereof can also be used. In the embodiment of FIG. 8, the anode body 16A is enhanced by the addition of a supplementary body portion 35 of a different material. This body portion is formed of a metal which is of increased potential difference from the steel reinforcing bar relative to the main body of the anode, so that this anode body will provide an enhanced potential difference in an initial operating condition but the additional body will be consumed more quickly so that it becomes used up at an early stage. The additional body therefore provides a "kick start" to the process generating an initial high potential difference and then after it is consumed, the remaining process carries on through the use of the previously described anode body 16A.

In this arrangement, the additional body is applied simply in the form of a cylindrical washer 35 at the lower end of the body 16A so it can be applied in place and then the pin 31 driven through the bore 30 and through a similar bore in the washer into the reinforcing bar 11 as previously described. The washer can thus be attached to the body 16A before use or can be a simple separate element. The washer can be applied at either end of the body on the pin and is held in place by the rigidity of the pin as previously described.

A further alternative is shown in FIG. 9 where the pin 31 is replaced by a deformable block 36 of a flowable metal such as lead. In this embodiment therefore the body 16B does not include a central bore but instead carries the lead block 36 on its lower end 27. The impact tool in this case therefore acts to drive a force through the body 16B into the flowable material block 36 so as to deform that material and bond it to the reinforcing bar 11 by the flowing action of the material.

In FIG. 10 is shown yet further alternative in which a pin 31A is provided already inserted through the body 16C. In this arrangement the hole 30 through the body 16C is arranged as a friction fit on the pin so that the pin is held in place without necessity for deformation of the body 16C. The pin thus has a lower end projecting downwardly from the underside of the body 16C and this lower end or tip 37 is welded to the upper surface of the reinforcing bar 11 by an arc welding system 38 of conventional type having a return wire 39 connected to the reinforcing bar generally at a separate location. Thus the electrical current through the pin 31A acts to weld the lower end of the pin to the reinforcing bar to provide a permanent fixed upstanding pin holding the anode body 16C accurately in place within the drilled hole 25.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method for cathodic protection of a concrete structure comprising:

providing a concrete structure having a layer of concrete and a steel member in contact with the layer of concrete;

providing a sacrificial anode member;

burying the anode member within the layer so as to be in contact with the concrete layer;

the sacrificial anode member as provided and prior to being buried in the concrete layer comprising an anode body of an anode material which is covered on at least one surface thereof by a coating material which is carried by the anode body;

the anode member being arranged such that, when the anode member is buried, the coating material is in contact with the concrete layer;

the coating material being arranged to allow communication of current through the coating material and the concrete layer between the anode body and the steel member so as to provide cathodic protection for the steel member by an electrical potential between the anode body and the steel member which causes a current to flow through the concrete layer tending to inhibit corrosion of the steel member;

the coating material comprising a solid material with a binder attaching the coating material to the anode body;

providing in the coating material an additive different from the coating material itself which additive is a deliquescent material which is bound into the coating materials;

causing the presence of the deliquescent material bound into the coating material to absorb sufficient moisture into the coating material to maintain conductivity around the anode body;

and causing the presence of deliquescent material to keep the interface between the anode body and the coating material electrochemically active to ensure that sufficient current is maintained between the anode body and the steel member during the life of the anode body to maintain said cathodic protection.

[2. The method according to claim 1 wherein the coating material fully surrounds the anode member.]

3. The method according to claim 1 wherein the deliquescent material is in solid form in the coating material.

4. The method according to claim 1 wherein the coating material has a pH in the range 12 to 14.

5. The method according to claim 1 including the step of rigidly attaching the anode member to the steel member.

[6. The method according to claim 5 wherein the anode member is attached to the steel member by an impact thereon causing flow of a flowable metal portion to attach the flowable metal portion to the anode member and to the steel member.]

[7. The method according to claim 1 wherein the anode member is attached to the steel member by a solid pin rigidly attached to the anode member and rigidly attached to the steel member.]

[8. The method according to claim 7 wherein the solid pin passes through the anode member such that the anode member surrounds the solid pin.]

[9. The method according to claim 7 wherein the solid pin has one end driven into the steel member by an impact tool.]

[10. The method according to claim 7 wherein the solid pin has one end electrically welded to the steel member.]

11. A method for cathodic protection of a concrete structure comprising:

providing an existing concrete structure having a steel reinforcing member and a layer of concrete covering the reinforcing member so as to define a surface of the concrete layer spaced from the reinforcing member;

providing a sacrificial anode body formed of an anode material;

drilling a hole in the layer of the existing concrete structure so as to expose a reinforcing member therein;

inserting the anode body into the hole, the anode body being shaped for insertion into the drilled hole;

attaching the anode body to the reinforcing member;

filling the hole with a filler material;

the anode body being arranged such that, when the anode body is buried, the filler material is in contact with the concrete layer;

the filler material being arranged to allow communication of current through the filler material and the concrete layer between the anode body and the reinforcing member so as to provide cathodic protection for the steel reinforcing member by an electrical potential between the anode body and the steel reinforcing member, which generates a current tending to inhibit corrosion of the steel reinforcing member while causing the sacrificial anode to be consumed;

providing in the filler material an additive which is a deliquescent material which is bound into the filler material;

causing the presence of the deliquescent material bound into the filler material to absorb sufficient moisture into the filler material to maintain conductivity around the anode body;

and causing the presence of the deliquescent material to keep the interface between the anode body and the filler material electrochemically active to ensure that sufficient current is maintained between the anode body and the steel reinforcing member during the life of the anode body to maintain said cathodic protection.

[12. The method according to claim 11 wherein the anode body is attached to the reinforcing member by a solid pin rigidly attached to the anode body and rigidly attached to the reinforcing member.]

[13. The method according to claim 12 wherein the pin passes through the anode body such that the anode body surrounds the pin and such that the pin extends longitudinally within the drilled hole.]

[14. The method according to claim 12 wherein the solid pin has one end driven into the reinforcing member by an impact tool.]

[15. The method according to claim 12 wherein the solid pin has one end electrically welded to the reinforcing member.]

[16. The method according to claim 11 wherein the anode body is attached to the reinforcing member by an impact thereon causing flow of a flowable metal portion to attach the flowable metal portion to the anode body and to the reinforcing member.]

17. A method for cathodic protection of a concrete structure comprising:

providing a concrete structure having a steel reinforcing member and a layer of concrete covering the reinforcing member so as to define a surface of the concrete layer spaced from the reinforcing member;

providing a sacrificial anode member;

forming a hole in an existing layer of concrete so as to expose a reinforcing member therein;

inserting the sacrificial anode member into the hole and rigidly attaching the sacrificial anode member to the reinforcing member so as to extend therefrom into the hole;

filling the hole with a filler material;

and arranging the buried sacrificial anode member and the steel reinforcing member so as to provide cathodic protection for the steel reinforcing member by an electrical potential between the sacrificial anode member and the steel reinforcing member which generates a current tending to inhibit corrosion of the steel reinforcing member while causing the sacrificial anode member to be consumed.

18. The method according to claim 17 wherein the sacrificial anode member is attached to the reinforcing member by a solid pin rigidly attached to the sacrificial anode member and rigidly attached to the reinforcing member.

[19. The method according to claim 18 wherein the pin passes through the sacrificial anode member such that the sacrificial anode member surrounds the solid pin and such that the solid pin extends substantially at a right angle to the reinforcing member.]

20. The method according to claim 18 wherein the solid pin has one end driven into the reinforcing member by an impact tool.

21. The method according to claim 18 wherein the solid pin has one end electrically welded to the reinforcing member.

22. The method according to claim 17 wherein the sacrificial anode member is attached to the reinforcing member by an impact thereon causing flow of a flowable metal portion to attach the flowable metal portion to the sacrificial anode member and to the reinforcing member.

23. A method for cathodic protection of a concrete structure comprising:

providing an existing concrete structure having a steel reinforcing member and a layer of concrete covering the reinforcing member so as to define a surface of the concrete layer spaced from the reinforcing member;

providing a sacrificial anode body formed of an anode material;

excavating a hole in the layer of the existing concrete structure so as to expose a reinforcing member therein;

inserting the anode body into the hole, the anode body being shaped for insertion into the excavated hole;

attaching the anode body to the reinforcing member;

providing around the anode body a filler material;

the anode body being arranged such that, when the anode body is buried in the concrete layer, the filler material is in contact with the concrete layer;

the filler material being arranged to allow communication of current through the filler material and the concrete layer between the anode body and the reinforcing member so as to provide cathodic protection for the steel reinforcing member by an electrical potential between the anode body and the steel reinforcing member which generates a current tending to inhibit corrosion of the steel reinforcing member while causing the sacrificial anode to be consumed;

providing in the filler material an additive which is *different from the filler material itself which additive is* a deliquescent material which is bound into the filler material;

causing the presence of the deliquescent material bound into the filler material to absorb sufficient moisture into the filler material to maintain conductivity around the anode body;

and causing the presence of the deliquescent material to keep the interface between the anode body and the filler material electrochemically active to ensure that sufficient current is maintained between the anode body and the steel reinforcing member during the life of the anode body to maintain said cathodic protection.

*24. The method according to claim 1 wherein the deliquescent material provided in the coating material comprises lithium nitrate.*

*25. The method according to claim 1 wherein the deliquescent material provided in the coating material comprises calcium nitrite.*

*26. The method according to claim 1 wherein the coating material comprises a porous material.*

*27. The method according to claim 1 wherein the sacrificial anode member comprises a compressible material.*

*28. The method according to claim 23 wherein the deliquescent material provided in the filler material comprises lithium nitrate.*

*29. The method according to claim 23 wherein the deliquescent material provided in the filler material comprises calcium nitrite.*

*30. The method according to claim 23 wherein the filler material comprises a porous material.*

*31. The method according to claim 1 wherein the deliquescent material provided in the coating material comprises calcium nitrate.*

*32. The method according to claim 1 wherein the deliquescent material provided in the coating material comprises calcium chloride.*

*33. The method according to claim 1 wherein the deliquescent material provided in the coating material comprises magnesium chloride.*

*34. The method according to claim 1 wherein the deliquescent material provided in the coating material comprises calcium sulphate.*

*35. The method according to claim 23 wherein the deliquescent material provided in the coating material comprises calcium nitrate.*

*36. The method according to claim 23 wherein the deliquescent material provided in the coating material comprises calcium chloride.*

*37. The method according to claim 23 wherein the deliquescent material provided in the coating material comprises magnesium chloride.*

*38. The method according to claim 23 wherein the deliquescent material provided in the filler material comprises calcium sulphate.*

*39. The method according to claim 1 wherein the coating material comprises a porous material, and the coating material, including the deliquescent material, has an alkalinity which alone is insufficient to maintain said cathodic protection.*

*40. The method according to claim 1 wherein the pH of the deliquescent material is less than 12.*

*41. The method according to claim 1 wherein the deliquescent material comprises a material other than an alkali metal oxide or an alkali metal hydroxide.*

*42. The method according to claim 1 wherein the deliquescent material comprises a material other than a material selected from the group consisting of lithium hydroxide, potassium hydroxide, sodium hydroxide, sodium oxide and potassium oxide and the coating material comprises a cementitious mortar.*

*43. The method according to claim 42 wherein the deliquescent material is admixed into the mortar.*

*44. The method according to claim 1 wherein the current between the anode body and steel member is maintained at a level greater than would occur without the presence of the deliquescent material.*

*45. The method according to claim 1 wherein the coating material comprises a material other than a gel or paste.*

*46. The method according to claim 1 wherein the coating material is of a solid form so as not to deform when the anode member is buried in the concrete layer.*

*47. The method according to claim 1 wherein the anode body is connected to the steel member using an electrical connector which is attached to the anode material.*

*48. The method according to claim 1 wherein the electrical connector comprises steel.*

*49. The method as claimed in claim 1 wherein the deliquescent material comprises a material other than an alkali metal oxide or an alkali metal hydroxide, said coating material comprises porous material comprising a cementitious material, the current between the anode and steel member as maintained at a level greater than would occur without the presence of the deliquescent material, and said electrical connector being attached to anode material and being comprised of steel.*

*50. The method according to claim 1 wherein said anode member comprises at least two anode materials.*

*51. The method as claimed in claim 1 wherein said coating material comprises a cementitious material, said deliquescent material has a pH less than 12 and said coating material is of solid form so as not to deform when the anode member is buried in the layer.*

*52. The method according to claim 1 wherein said deliquescent material is other than an alkali metal oxide or an alkali metal hydroxide and said coating material is other than a gel or paste.*

*53. The method according to claim 1 wherein the anode member is installed in direct contact with the reinforcing member.*

*54. The method according to claim 53 wherein the anode member conforms to the reinforcing member.*

*55. The method according to claim 1 wherein the deliquescent material is in liquid form within the coating material.*

*56. The method according to claim 1 wherein the sacrificial anode member comprises a fibrous material.*

*57. The method according to claim 17 wherein the anode member is maintained in spaced relationship with respect to the reinforcing member.*

*58. The method according to claim 17 wherein an outer surface of the reinforcing member is engaged by the rigid attachment.*

* * * * *